Oct. 10, 1950      M. W. MARTIGNONE      2,525,557
TENSIONING DEVICE FOR SINGLE COLUMN BAND SAWS

Filed March 9, 1948      2 Sheets-Sheet 1

Inventor

Marion W. Martignone

By *Clarence A. O'Brien and Harvey B. Jackson*
Attorneys

Oct. 10, 1950     M. W. MARTIGNONE     2,525,557
TENSIONING DEVICE FOR SINGLE COLUMN BAND SAWS
Filed March 9, 1948     2 Sheets-Sheet 2
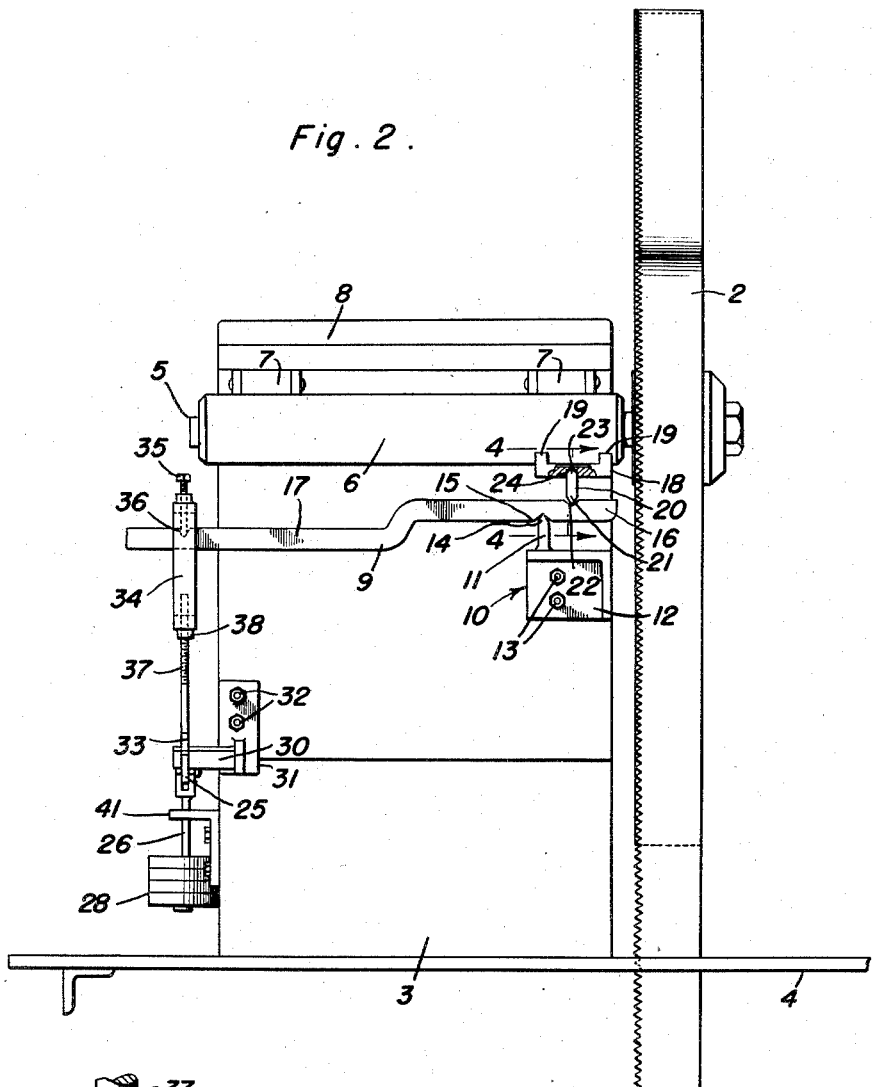
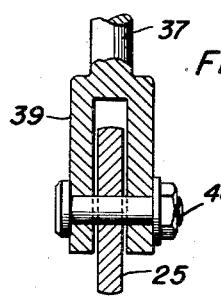
Inventor
Marion W. Martignone Patented Oct. 10, 1950

2,525,557

UNITED STATES PATENT OFFICE 2,525,557

TENSIONING DEVICE FOR SINGLE COLUMN BAND SAWS

Marion W. Martignone, Klamath Falls, Oreg.

Application March 9, 1948, Serial No. 13,866

1 Claim. (Cl. 143—27)

My invention relates to improvements in tensioning devices for single column band saws, the primary object in view being to equip such band saws with counter-balancing tensioning devices sufficiently sensitive to properly compensate for sudden and varied strains to which the saw band is subjected while at the same time properly tensioning the saw band.

Another object is to provide a device of the character and for the purpose above set forth which is simple in construction, inexpensive and easy to install on such band saws, and is adapted for installation without necessitating material change in the basic structure of the band saw.

Other and subordinate objects, within the purview of my invention, together with the precise nature of my improvements will be readily understood when the succeeding description and claims are read with reference to the drawings accompanying and forming part of this specification.

In said drawings:

Figure 2 is a view in side elevation;

Figure 3 is a view in vertical transverse section taken on the line 3—3 of Figure 1 and drawn to a larger scale;

Figure 1:
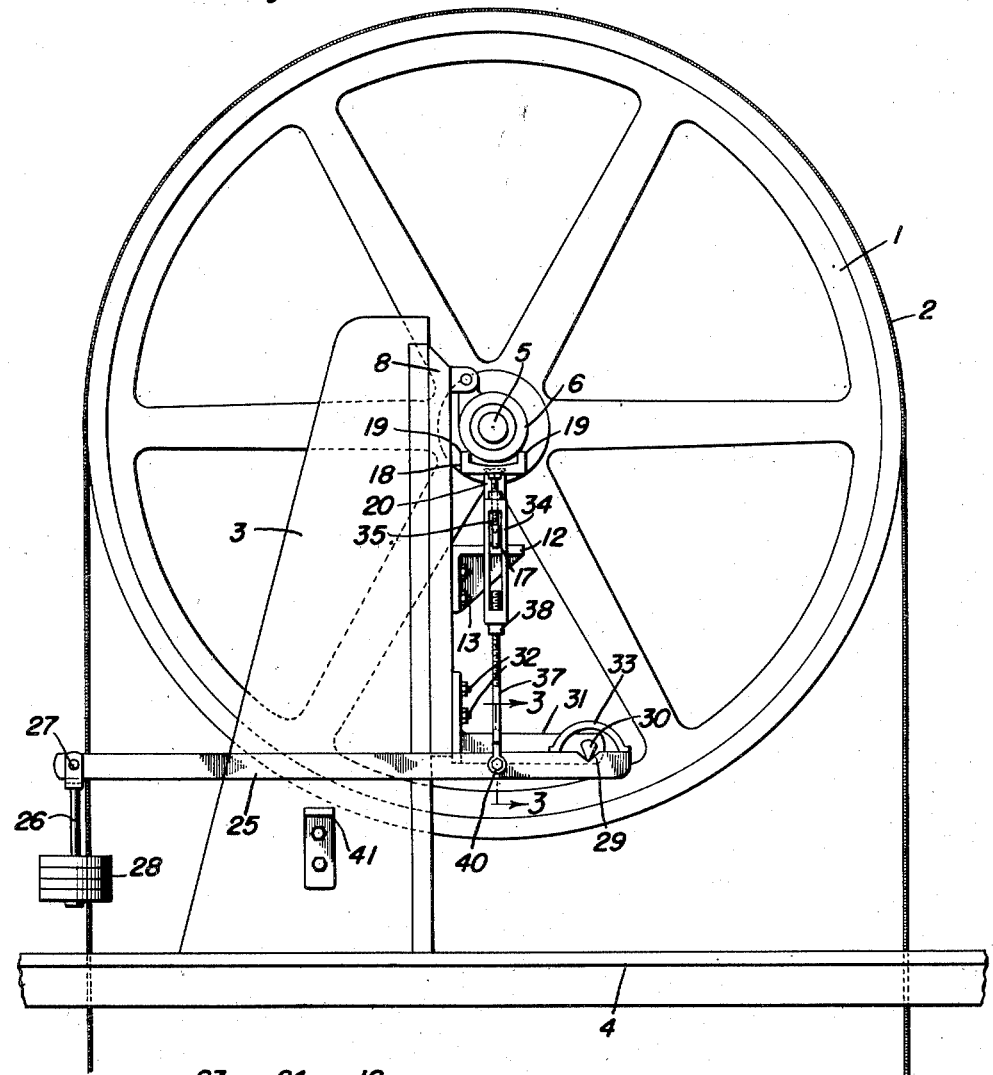
Figure 1 is a view in rear elevation illustrating my improved tensioning device applied to a single column band saw shown fragmentarily.
Figure 4:
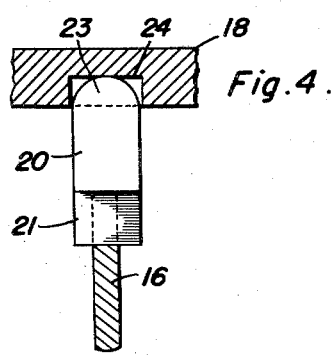
Figure 4 (Sheet 1) is a view in vertical transverse section taken on the line 4—4 of Figure 2 and drawn to a larger scale.

Referring now to the drawings by numerals, in the type of band saw with which my improvements are especially concerned, and which has been illustrated conventionally, as sufficient for the present purposes, an upper vertical band saw wheel 1 over which the saw band 2 runs operates alongside the front of a column 3 on a subjacent base structure 4 and is fixed on one end of a horizontal shaft 5 journalled in a horizontal bearing sleeve 6 extending across one side of the column 3. The bearing sleeve 6 is hinged adjacent opposite ends of the same, as at 7, on a mounting plate 8 on said side of the column 1, and so that said sleeve is vertically swingable to compensate for pull on the saw band 2 while maintaining tension on said band.

According to my invention, in the preferred, illustrated embodiment thereof, a horizontal supporting lever 9 for the sleeve bearing 6 is provided beneath the same to extend across said side of the column 3 along said bearing sleeve 6, and is mounted adjacent one end of the sleeve nearest the band saw wheel 1 on a knife edge bearing 10 for vertical swinging movement. The knife edge bearing 10 comprises an upright fulcrum bar 11 fixed to and upstanding from a bracket 12 bolted, as at 13, to the mounting plate 8, said bar having an upper knife edge 14 transverse to said lever 9 and seating in a transverse bottom edge notch 15 in said lever. The notch 15 is positioned in said lever 9 to provide a short lever arm 16 beneath the end of the bearing sleeve 6 nearest the band wheel 1, and a long lever arm 17 extending rearwardly beyond the column 3.

Compensating means is provided between the short lever arm 16 and said end of the bearing sleeve 6 comprising a saddle plate 18 with upturned corner lugs 19 in which said bearing sleeve 16 is cradled, and an upright fulcrum bar 20 for said plate having a lower knife edge end 21 transverse to said short lever arm 16 and seating in an upper edge notch 22 in said arm 16 with an upper rounded end 23 confined in a central, bottom socket 24 in said plate 18 and bearing upwardly against the plate.

A counter-weight lever 25 extends horizontally across the rear side of the column 3 below the rear end of the lever 9 and is fulcrumed at one end for vertical swinging, and provided at its other end with a pendant rod 26 pivoted, as at 27, thereon and adapted to sustain a stack of counter-weights 28. The counter-weight lever 25 is extended across the rear side of the column 3 at a right angle to the lever 9 to arrange the same close to said column in an out-of-the-way position. The fulcrumed end of the counter-weight lever 25 has an upper edge V-notch 29 therein seating a horizontal knife edge stud 30 extending laterally from a bracket arm 31 bolted, as at 32, to the before-mentioned plate 8. An arched guard 33 on said lever 25 covers the knife edge bearing formed by said notch 29 and knife edge stud 30.

A connection between said levers 9 and 25 is provided comprising a vertically slotted yoke 34 straddling said lever arm 17 of said lever 9 adjacent the end thereof and having a set bolt 35 threaded downwardly in its upper end with a needle point bearing 36 in the upper edge of said arm 17. A rod 37 threaded at its upper end into the lower end of said yoke 34, with a lock nut 38 thereon, has a forked lower end 39 straddling the counter-weight lever 25 and pivoted thereto by a transverse bolt 40 at a point closer to the fulcrumed end of said lever 25 than to the counter-weighted end of said lever.

As will be seen, the counter-weight lever 25 is urged downwardly on the knife edge stud 30 by the counter-weights 28 and thereby, through the yoke 34, rod 37 and bolt 35 tends to rock the lever 9 on the fulcrum bar 11 so as to swing the short lever arm 16 upwardly, and the short lever arm 16, through the medium of the fulcrum bar 20 and the saddle plate 18, exerts an upward thrust against the sleeve bearing 6 tending to swing said bearing upwardly and thereby tension the saw band 2. The fulcrum bar 20 compensates for vertical swinging of the short lever arm 16 relative to the saddle plate 18, and said plate permits rotary movement of the bearing sleeve 6 thereon resulting from vertical swinging of said sleeve about the hinges 7. The knife edge bearing 10 provides a frictionless fulcrum for the lever 9 and the notch 29 and knife edge stud 30 a like fulcrum for the counter-weight lever 25, while the needle point bearing 36 functions in the same manner as regards the point of connection between the yoke 34 and the lever arm 17 of the lever 9. The point of attachment of the load to the counter-weight lever 25, and the long lever arm 17 of the lever 9 provide for obtaining leverage necessary for sustaining the weight of the sleeve bearing 6, band saw wheel 1 and saw band 2 with the requisite tensioning of said saw band 2, all by means of light-weight counter-weights which may be used in numbers as found desirable for the purpose intended under different operating requirements.

A stop 41 for the counter-weight lever 25 is provided on the column 3 to check swinging of said lever in case the saw band 2 breaks or runs off the band saw wheel 1.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described my invention, what is claimed as new is:

The combination with the upper wheel of a band saw having a saw band thereon, and a mounting for said wheel including a horizontal bearing sleeve hingedly mounted for vertical swinging to tension said band, of a lever below said sleeve extending along the same, a knife edge bearing for said lever on which the lever is fulcrumed for vertical swinging, saw lever having a long and a short lever arm respectively, means supporting said sleeve on said short lever arm including a saddle plate with upright corner lugs on which said sleeve rests and is rotatable thereon upon vertical swinging of the sleeve, and counter-weight means for urging the long lever arm downwardly.

MARION W. MARTIGNONE.

REFERENCES CITED

The following references are of record in the file of this patent:

UNITED STATES PATENTS

| Number | Name | Date |
|---|---|---|
| 406,323 | Wilkin | July 2, 1889 |
| 544,999 | Thomas | Aug. 20, 1895 |
| 588,653 | Pelton | Aug. 24, 1897 |
| 644,125 | Bugbee | Feb. 27, 1900 |
| 919,128 | Cleveland | Apr. 20, 1909 |
| 1,037,900 | Hanhart | Sept. 10, 1912 |